(12) United States Patent
Iwamoto et al.

(10) Patent No.: US 10,379,325 B2
(45) Date of Patent: Aug. 13, 2019

(54) OPTICAL SYSTEM AND OPTICAL APPARATUS INCLUDING THE SAME

(71) Applicant: CANON KABUSHIKI KAISHA, Tokyo (JP)

(72) Inventors: Shunji Iwamoto, Utsunomiya (JP); Shinichiro Saito, Utsunomiya (JP); Satoshi Maetaki, Utsunomiya (JP); Takahiro Hatada, Utsunomiya (JP); Suguru Inoue, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 15/707,221

(22) Filed: Sep. 18, 2017

(65) Prior Publication Data

US 2018/0095256 A1 Apr. 5, 2018

(30) Foreign Application Priority Data

Sep. 30, 2016 (JP) ................. 2016-193118

(51) Int. Cl.
| | | |
|---|---|---|
| *G02B 15/163* | (2006.01) | |
| *G02B 9/64* | (2006.01) | |
| *C03C 3/064* | (2006.01) | |
| *G02B 13/18* | (2006.01) | |
| *G02B 15/177* | (2006.01) | |

(52) U.S. Cl.
CPC ............ *G02B 15/163* (2013.01); *C03C 3/064* (2013.01); *G02B 9/64* (2013.01); *G02B 13/18* (2013.01); *G02B 15/177* (2013.01)

(58) Field of Classification Search
CPC .... G02B 15/163; G02B 13/18; G02B 15/177; G02B 15/173; G02B 15/17; G02B 15/26; G02B 15/28; G02B 9/64; G02B 27/0025; G02B 9/62; G02B 15/20; G02B 9/00; G02B 15/15; C03C 3/064
USPC ............................ 359/362, 672–675
See application file for complete search history.

(56) References Cited

U.S. PATENT DOCUMENTS

| | | | |
|---|---|---|---|
| 4,643,536 A | 2/1987 | Yamada | |
| 5,952,256 A | 9/1999 | Morishita et al. | |
| 6,906,866 B2 | 6/2005 | Hudyma | |
| 2009/0080087 A1 | 3/2009 | Yamada et al. | |
| 2012/0250168 A1 | 10/2012 | Eguchi | |
| 2016/0054549 A1* | 2/2016 | Takemoto ............ | G02B 15/167 359/683 |
| 2016/0077309 A1* | 3/2016 | Ohashi ................. | G02B 15/163 359/740 |
| 2016/0274336 A1* | 9/2016 | Kawamura ............ | G02B 9/64 |
| 2016/0274443 A1 | 9/2016 | Ogata | |

FOREIGN PATENT DOCUMENTS

| | | |
|---|---|---|
| JP | 6-135738 A | 5/1994 |
| JP | 10-265238 A | 10/1998 |
| JP | 2015-215557 A | 12/2015 |

* cited by examiner

*Primary Examiner* — Stephone B Allen
*Assistant Examiner* — Rahman Abdur
(74) *Attorney, Agent, or Firm* — Canon U.S.A., Inc., IP Division

(57) ABSTRACT

An optical system includes a negative lens satisfying the following conditional expressions:

$$30 \leq vd \leq 40,$$

$$1.225 \leq [nd-(14.387/vd)] \leq 1.276, \text{ and}$$

$$0.4300 \leq [\theta gF-(2.9795/vd)] \leq 0.5010,$$

where $vd$ is an Abbe number of the negative lens, $\theta gF$ is a partial dispersion ratio of the negative lens at a g-line and an F-line, and $nd$ is a refractive index of the negative lens at a d-line.

14 Claims, 12 Drawing Sheets

OPTICAL SYSTEM AND OPTICAL
APPARATUS INCLUDING THE SAME

BACKGROUND OF THE INVENTION

Field of the Invention

The present invention relates to an optical system, which is suitable for an optical apparatus such as a digital video camera, a digital still camera, a broadcast camera, a silver-halide film camera, and a monitoring camera.

Description of Related Art

It has been known that a negative lens made of an optical material having high dispersion is used to correct the chromatic aberration of an optical system. In this case, axial chromatic aberration can be corrected for a wider range of wavelengths in a manner in which an optical material having high dispersion and a low partial dispersion ratio is used to form the negative lens.

In Japanese Patent Application Laid-Open No. 10-265238, optical glass having high dispersion and exhibiting negative anomalous partial dispersion is disclosed.

SUMMARY OF THE INVENTION

The present invention provides an optical system that enables appropriate correction of chromatic aberration and field curvature.

According to an aspect of the present invention an optical system includes a negative lens. The following conditional expressions are satisfied: $30 \leq vd \leq 40$, $1.225 \leq [nd-(14.387/vd)] \leq 1.276$, and $0.4300 \leq [\theta gF-(2.9795/vd)] \leq 0.5010$, where vd is an Abbe number of the negative lens, $\theta gF$ is a partial dispersion ratio of the negative lens at a g-line and an F-line, and nd is a refractive index of the negative lens at a d-line.

According to another aspect of the present invention an optical system includes an aperture stop, a first negative lens that is disposed on a light incident side of the aperture stop and whose concave surface faces an image side, and a second negative lens that is disposed on a light emission side of the aperture stop and whose concave surface faces an object side. The following conditional expressions are satisfied: $30 \leq vd1 \leq 40$, $30 \leq vd2 \leq 40$, $1.225 \leq [nd1-(14.387/vd1)] \leq 1.276$, $1.225 \leq [nd2-(14.387/vd2)] \leq 1.276$, $0.4300 \leq [\theta gF1-(2.9795/vd1)] \leq 0.5010$, and $0.4300 \leq [\theta gF2-(2.9795/vd2)] \leq 0.5010$, where vd1 is an Abbe number of the first negative lens, vd2 is an Abbe number of the second negative lens, $\theta gF1$ is a partial dispersion ratio of the first negative lens at a g-line and an F-line, $\theta gF2$ is a partial dispersion ratio of the second negative lens at the g-line and the F-line, nd1 is a refractive index of the first negative lens at a d-line, and nd2 is a refractive index of the second negative lens at the d-line.

Further features of the present invention will become apparent from the following description of exemplary embodiments with reference to the attached drawings.

DESCRIPTION OF THE EMBODIMENTS

Figure 1:
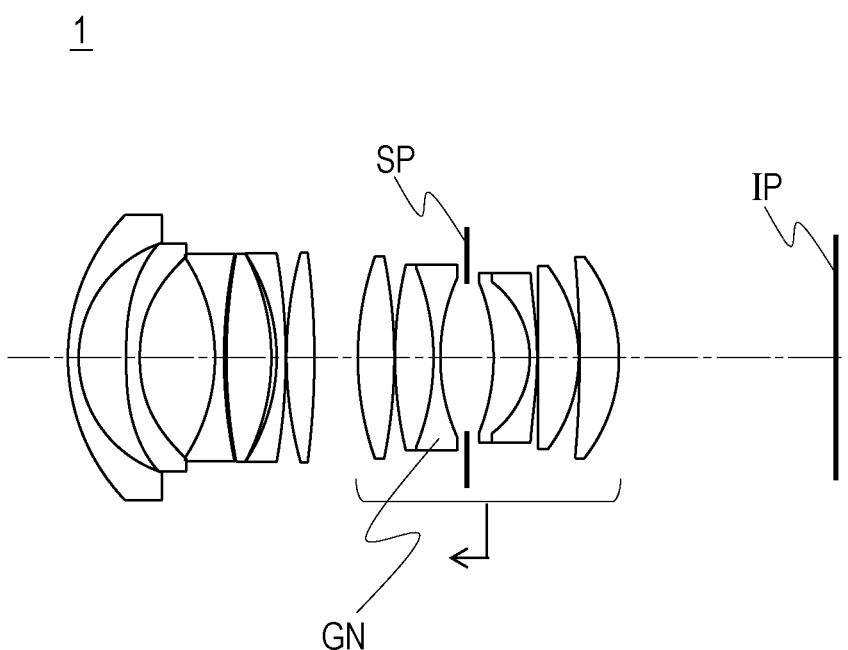
FIG. 1 is a sectional view of an optical system according to an example 1.
Figure 2:
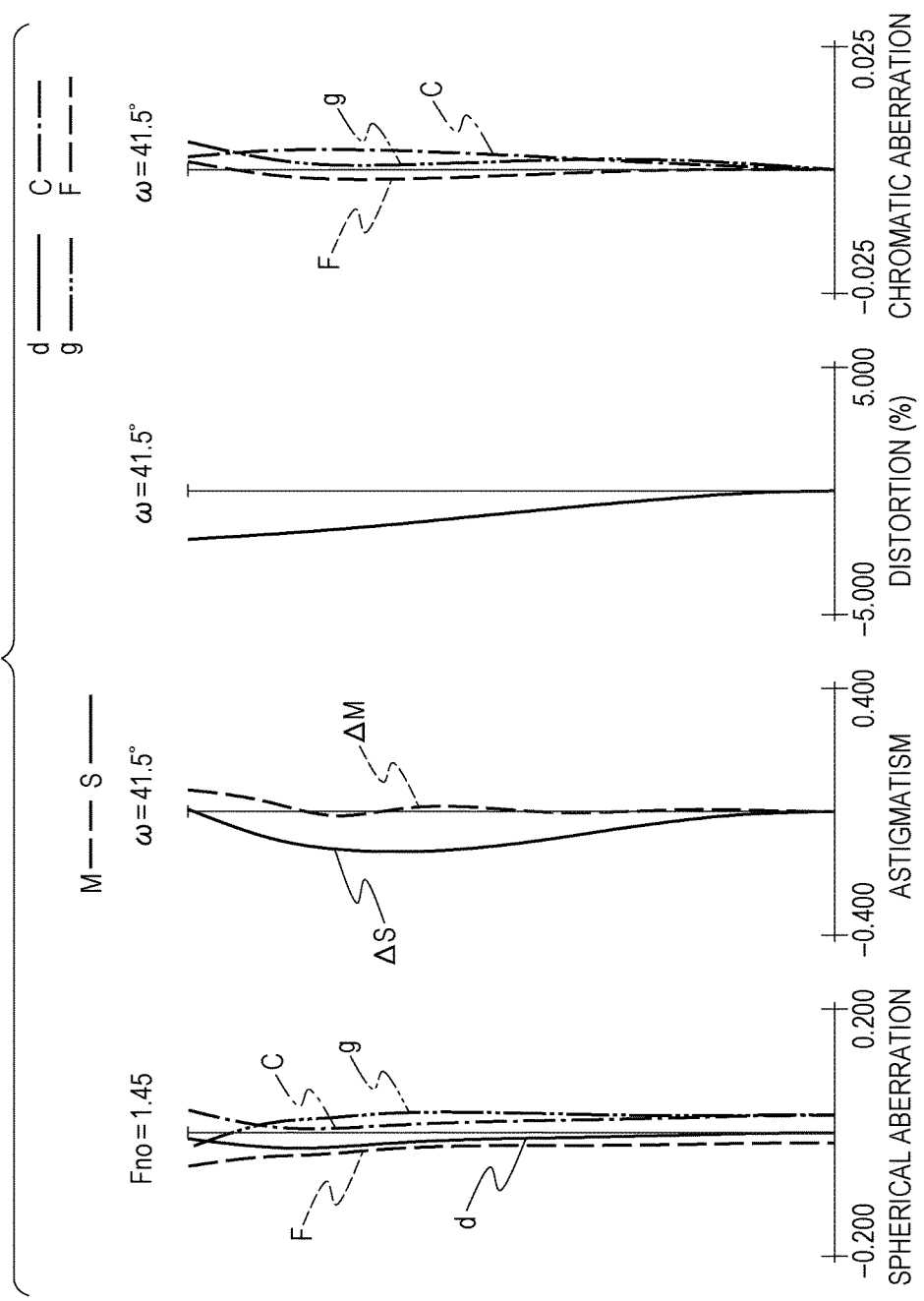
FIG. 2 is a diagram illustrating aberrations of the optical system according to the example 1.
Figure 3:
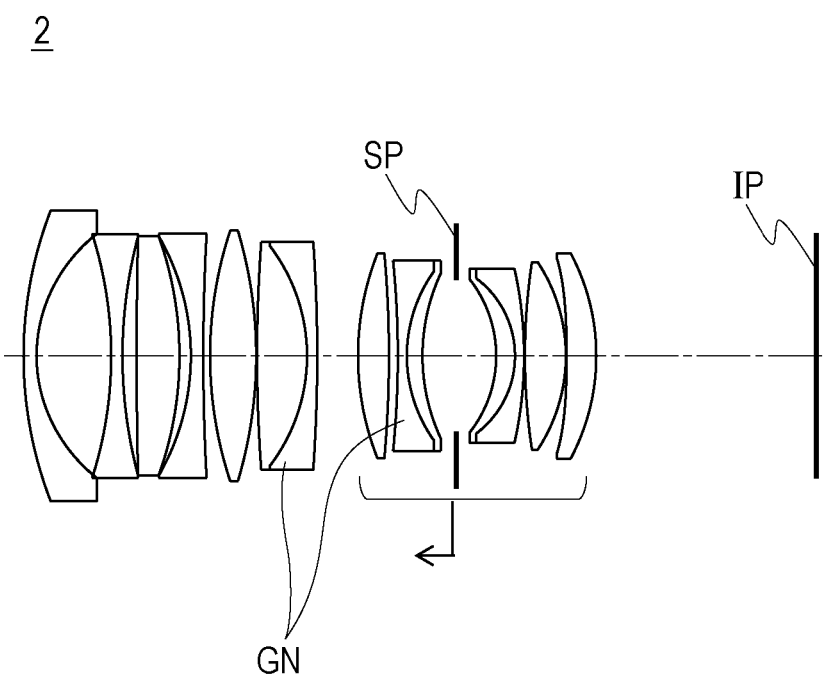
FIG. 3 is a sectional view of an optical system according to an example 2.
Figure 4:
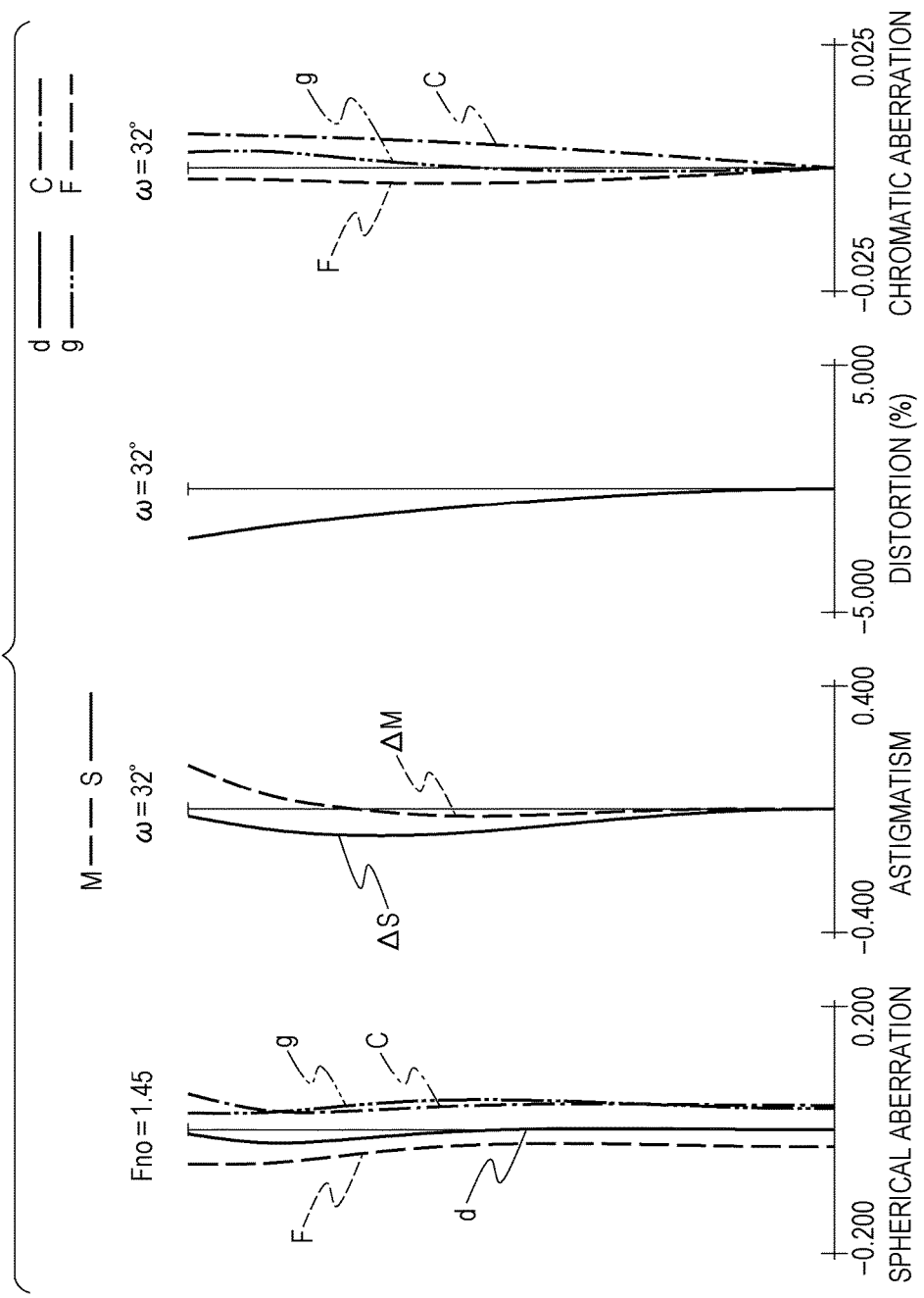
FIG. 4 is a diagram illustrating aberrations of the optical system according to the example 2.
Figure 5:
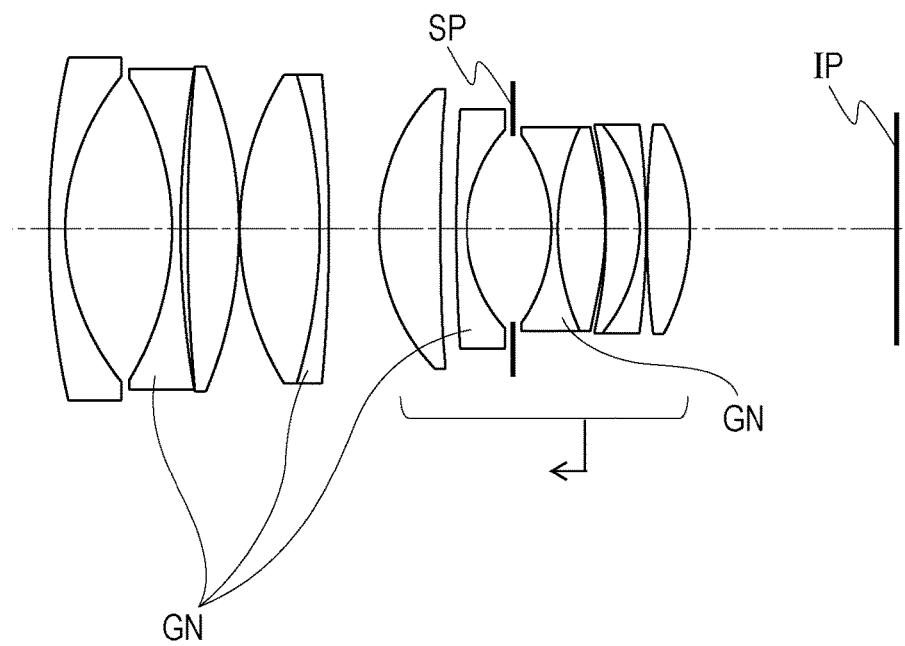
FIG. 5 is a sectional view of an optical system according to an example 3.
Figure 6:
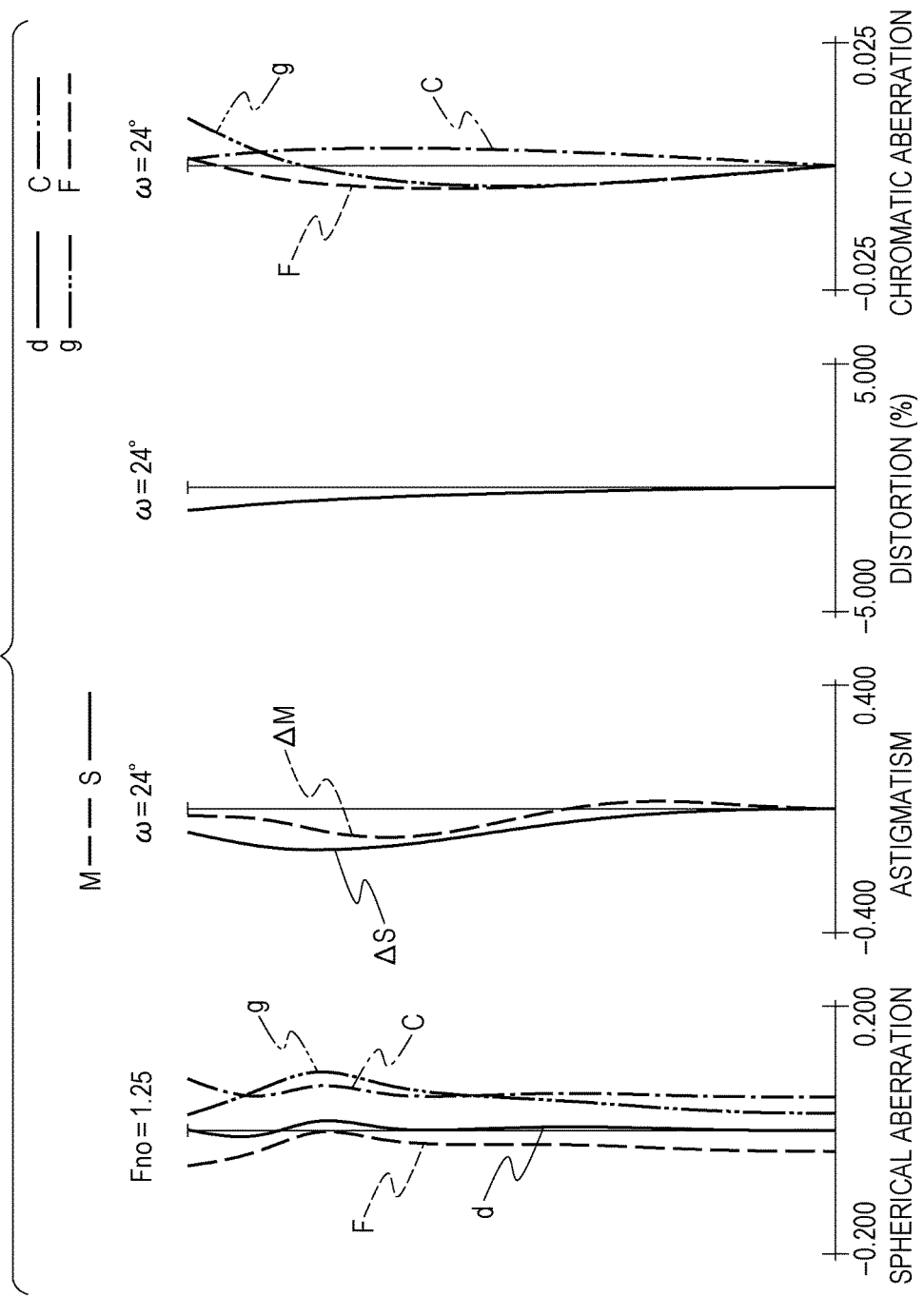
FIG. 6 is a diagram illustrating aberrations of the optical system according to the example 3.
Figure 7:
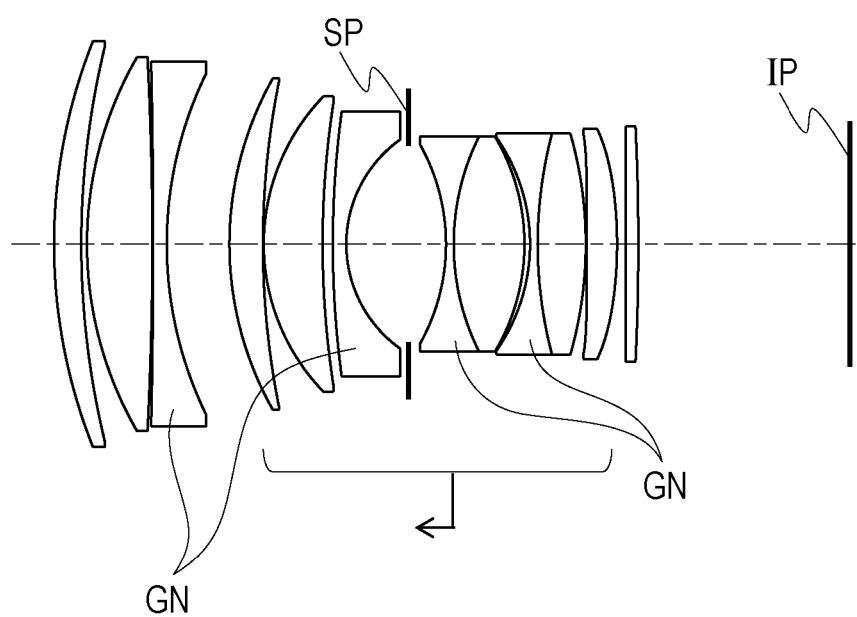
FIG. 7 is a sectional view of an optical system according to an example 4.
Figure 8:
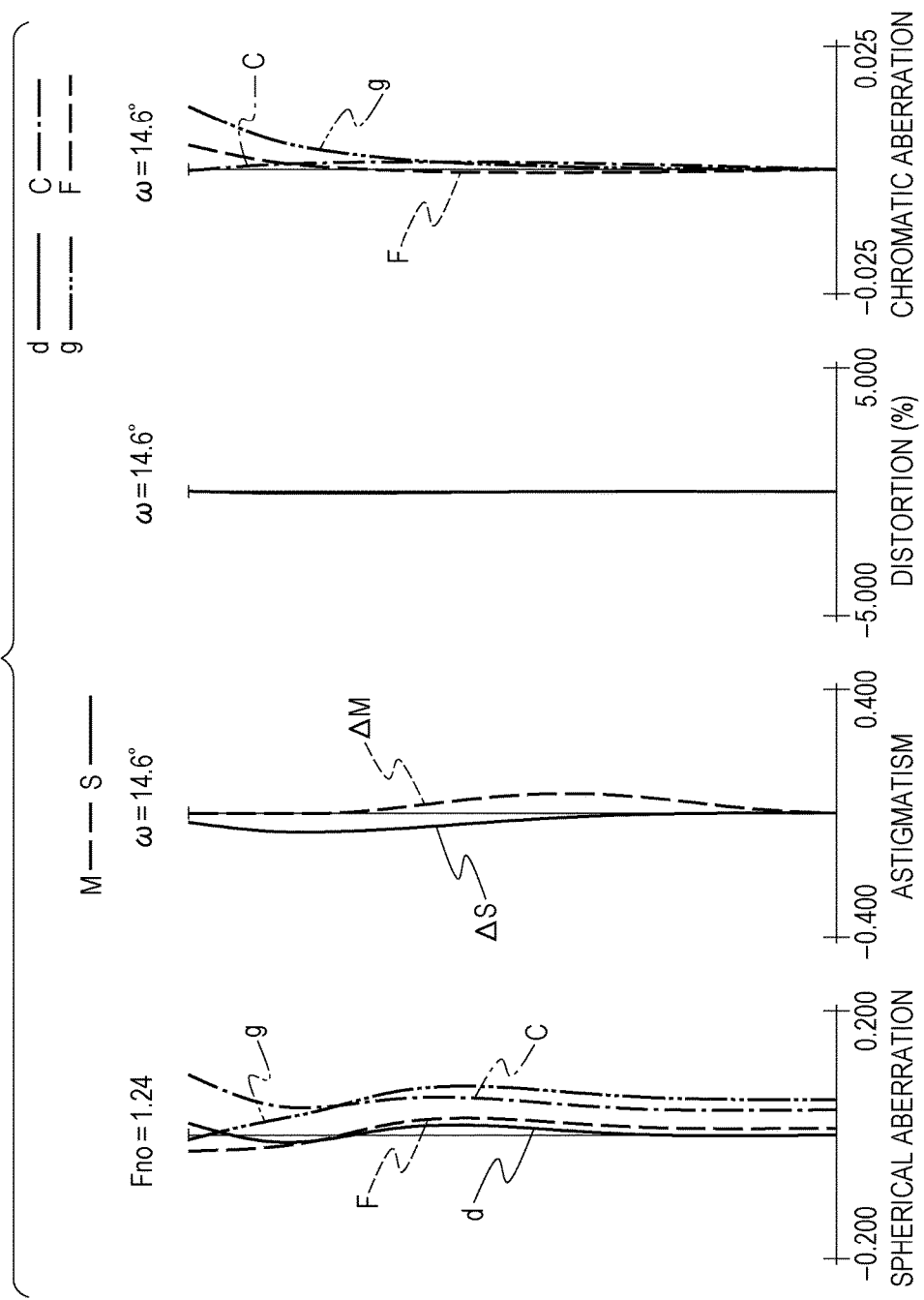
FIG. 8 is a diagram illustrating aberrations of the optical system according to the example 4.
Figure 9:
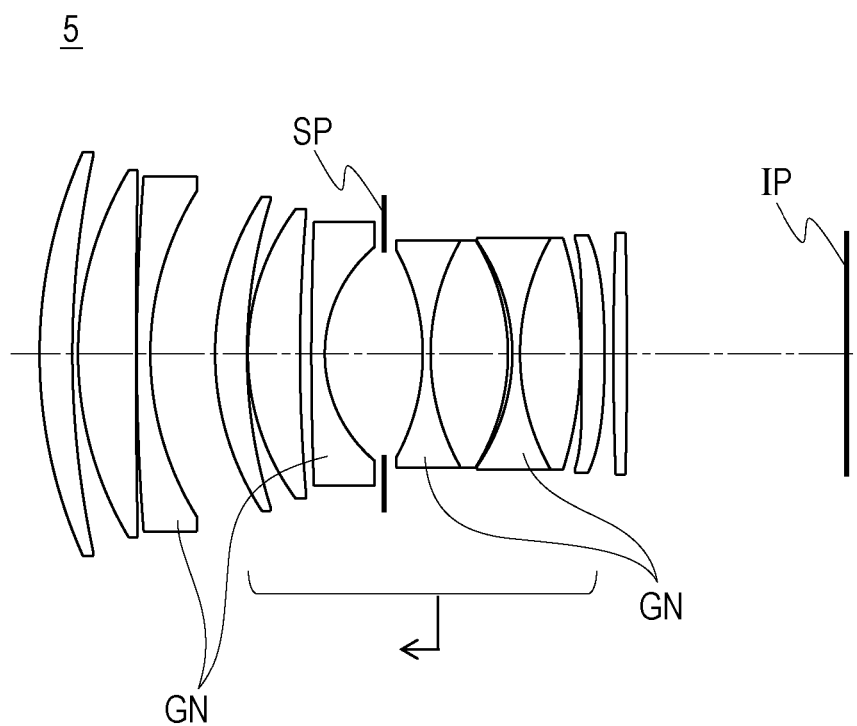
FIG. 9 is a sectional view of an optical system according to an example 5.
Figure 10:
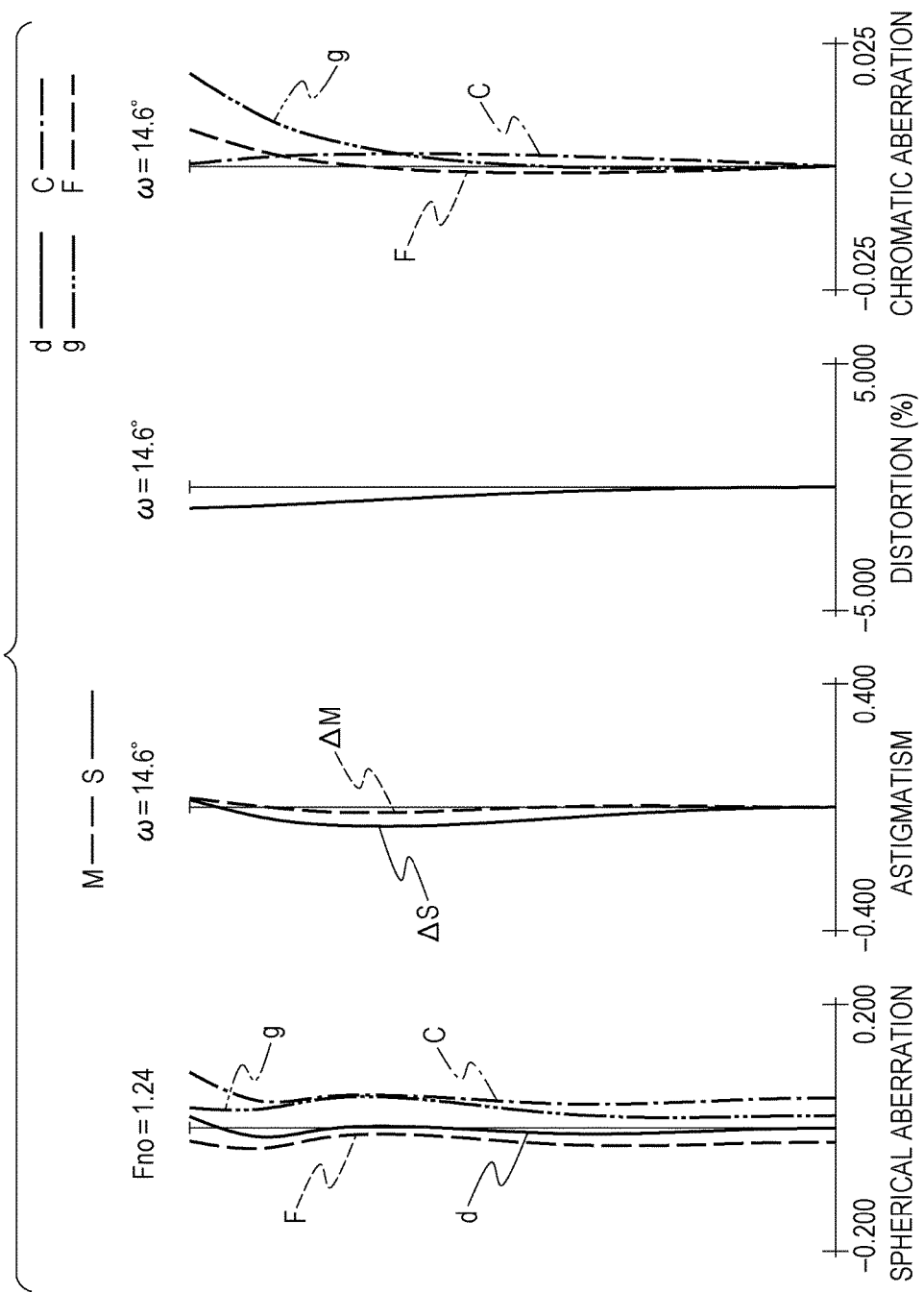
FIG. 10 is a diagram illustrating aberrations of the optical system according to the example 5.

Optical systems according to examples of the present invention and an optical apparatus including one of the optical systems will now be described. Each of the optical systems according to the examples is a taking lens system used for an image pickup apparatus, such as a digital still camera, a digital video camera, a broadcast camera, silver-halide film camera, or a monitoring camera. Each of the optical systems according to the examples can be used as a projection optical system for a projector.

FIGS. 1, 3, 5, 7, and 9 are sectional views of optical systems according to examples 1 to 5 in the case where the optical systems focus to infinity. Arrows illustrated in the sectional views denote a direction in which lenses move during focusing from infinity to the shortest distance. In the sectional views, the left-hand side of the lenses corresponds to an object side (screen side in the case of a projection optical system for a projector), and the right-hand side thereof corresponds to an image side (original image side in the case of a projection optical system for a projector).

The symbol SP in the sectional views denotes an aperture stop. The symbol IP denotes an image plane. In the case where the optical systems according to the examples are used as image pickup optical systems for video cameras or digital cameras, an image pickup device such as a CCD sensor or a CMOS sensor is disposed on the image plane IP. In the case where the optical systems according to the examples are used as image pickup optical systems for silver-halide film cameras, a film is disposed on the image plane IP.

FIGS. 2, 4, 6, 8, and 10 are diagrams illustrating aberrations of the optical systems according to the examples 1 to 5. In the diagrams, the symbol Fno denotes an F number, the symbol ω denotes a half angle of view (degrees), which is an angle of view by using paraxial approximation. In a part of each diagram that illustrates spherical aberration, the symbol d (solid line) denotes a d-line (a wavelength of 587.6 nm), the symbol g (two-dot chain line) denotes a g-line (a wavelength of 435.8 nm), the symbol C (one-dot chain line) denotes a C-line (a wavelength of 656.3 nm), and the symbol F (dashed line) denotes an F-line (a wavelength of 486.1 nm).

In a part of each diagram that illustrates astigmatism, the symbol ΔS (solid line) denotes a sagittal image plane at the d-line, the symbol ΔM (dashed line) denotes a meridional image plane at the d-line. In the drawings, distortion aberration at the d-line is illustrated. In a part of each diagram that illustrates transverse chromatic aberration, the symbol g (two-dot chain line) denotes the g-line, the symbol C (one-dot chain line) denotes the C-line, and the symbol F (dashed line) denotes the F-line.

To successfully correct the chromatic aberration and field curvature, the optical systems according to the examples each include at least one negative lens GN that is a concave lens having a thickness that gradually increases with increasing a distance from the optical axis and satisfying the following conditional expressions (1) to (3):

$$30 \leq \nu d \leq 40, \tag{1}$$

$$1.225 \leq [nd-(14.387/\nu d)] \leq 1.276, \tag{2}$$

$$0.4300 \leq [\theta gF-(2.9795/\nu d)] \leq 0.5010. \tag{3}$$

In the expressions (1) and (2), νd represents the Abbe number of the negative lens GN. In the expression (2), nd represents the refractive index of the negative lens GN at the d-line. In the expression (3), θgF represents the partial dispersion ratio of the negative lens GN at the g-line and the F-line.

The Abbe number νd and the partial dispersion ratio θgF are respectively defined by the following expressions (4) and (5):

$$\nu d = (nd-1)/(nF-nC), \tag{4}$$

$$\theta gF = (ng-nd)/(nF-nC), \tag{5}$$

where ng, nF, nd, and nC respectively represent the refractive index at the g-line, the F-line, the d-line, and the C-line of the Fraunhofer lines.

The expressions (1) to (3) indicate that the optical systems according to the examples each include the negative lens GN, which is made of an optical material having high dispersion, a low partial dispersion ratio, and a low refractive index. The reason why the chromatic aberration and the field curvature can be corrected by using the negative lens GN will be described with reference to FIG. 11.

Figure 11:
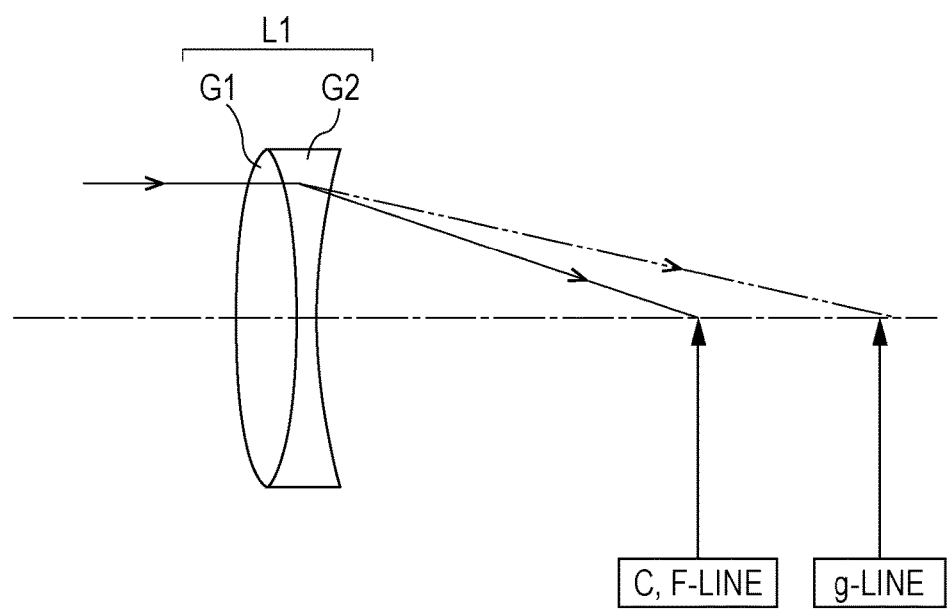
FIG. 11 illustrates achromatism of two colors and a secondary spectrum in an optical system having a positive refractive power.

FIG. 11 schematically illustrates achromatism of two colors (C- and F-lines) and residual secondary spectrum in an optical system L1 having a positive refractive power. The optical system L1 has a positive refractive power φ. The optical system L1 includes a positive lens G1 having a refractive power of φ1 and a negative lens G2 having a refractive power φ2. The refractive powers φ1 and φ2 satisfy the following relationship (6):

$$\phi 1 + \phi 2 = \phi. \tag{6}$$

The condition of achromatism of the C-line and the F-line in a thin system formed of the two lenses G1 and G2 that are in close contact with each other is given by the following expression (7):

$$\phi 1/\nu d1 + \phi 2/\nu d2 = 0, \tag{7}$$

where νd1 and νd2 respectively represent the Abbe number of the two lenses G1 and G2.

In the case where the expression (7) holds, as illustrated in FIG. 11, the imaging position of light at the C-line matches the imaging position of light at the F-line in the optical system L1. At this time, φ1 and φ2 are given by the following expressions (8) and (9):

$$\phi 1 = \phi \cdot \nu d1/(\nu d1 - \nu d2), \tag{8}$$

$$\phi 2 = -\phi \cdot \nu d2/(\nu d1 - \nu d2). \tag{9}$$

From the expressions (8) and (9), it can be shown that, to achieve achromatism of two colors (C- and F-lines) in the optical system L1, the Abbe number νd1 of the positive lens G1 needs to be relatively increased and the Abbe number νd2 of the negative lens G2 needs to be relatively decreased.

In general, the smaller the Abbe number of a glass material, the larger the partial dispersion ratio. That is, in FIG. 11, the positive lens G1 has a low partial dispersion ratio θgF1, and the negative lens G2 has a large partial dispersion ratio θgF2. In this case, the imaging position of the g-line shifts to the image side from that of the F-line and the C-line. The amount of the shift (secondary spectrum amount) Δ satisfies the following relationship (10):

$$\Delta \propto (\theta gF1 - \theta gF2)/(\nu d1 - \nu d2). \tag{10}$$

From the relationship (10), it can be shown that, in the case where θgF1 and θgF2 approximate to each other, the secondary spectrum amount Δ can be decreased. Accordingly, the negative lens G2 may be formed of an optical material having a low partial dispersion ratio. That is, a material exhibiting negative anomalous partial dispersion may be used as the material of the negative lens G2. Anomalous partial dispersion means that a partial dispersion property differs from that of a normal glass. Negative anomalous partial dispersion means that the degree of a partial dispersion property at short wavelengths is lower than that of a normal glass.

However, optical glass exhibiting high dispersion and negative anomalous partial dispersion tends to have a large refractive index. That is, in the case where each negative lens is formed of such known optical glass, the Petzval sum of an optical system increases, and it is difficult for the field curvature to be corrected.

In view of this, in the optical systems according to the examples, each negative lens is formed of an optical material having high dispersion, a low partial dispersion ratio, and a relatively low refractive index to successfully correct the chromatic aberration and the field curvature.

The conditional expressions (1) to (3) will now be described.

The expression (1) relates to the Abbe number of the negative lens GN. In the case where the degree of dispersion of the negative lens GN is so low that the value of νd exceeds the upper limit of the conditional expression (1), it is difficult for primary chromatic aberration to be corrected by using the negative lens GN. In the case where the degree of dispersion of the negative lens GN is so large that the value of νd is less than the lower limit, the transmittance of the negative lens GN decreases, and environmental resistance thereof becomes worse, which is not preferable.

To increase the effect of primary achromatism, the conditional expression (1) is preferably in the range given by the following expression (1a), more preferably in the range given by the following expression (1b):

$$31 \leq \nu d \leq 39.5, \tag{1a}$$

$$32 \leq \nu d \leq 38. \tag{1b}$$

The expression (2) defines the relationship between the refractive index and the Abbe number of the negative lens GN. In the case where the refractive index of the negative lens GN is so large that the expression (2) exceeds the upper limit, the Petzval sum is too large. Consequently, it is difficult for the field curvature to be corrected. In the case where the refractive index of the negative lens GN is so low that the expression (2) is less than the lower limit, a curvature of the negative lens GN that enables the negative lens GN to have a refractive power enough to correct the chromatic aberration and the field curvature increases, and it is difficult for the size of the optical systems to be decreased.

To achieve correction of the field curvature and decrease in the size of the optical systems, the expression (2) is preferably in the range given by the following expression (2a), more preferably in the range given by the following expression (2b):

$$1.235<[nd-(14.387/vd)]<1.270, \quad (2a)$$

$$1.245<[nd-(14.387/vd)]<1.270. \quad (2b)$$

The expression (3) relates to the anomalous partial dispersion of the negative lens GN. In the case where the degree of the negative anomalous partial dispersion of the negative lens GN is so low that the expression (3) exceeds the upper limit, it is difficult for the secondary spectrum of axial chromatic aberration to be sufficiently corrected by using the negative lens GN. In the case where the degree of the negative anomalous partial dispersion is so large that the expression (3) is less the lower limit, it is difficult to manufacture a glass material satisfying the expressions (1) and (2).

To decrease the primary and secondary chromatic aberration in a balanced manner, the expression (3) is preferably in the range given by the following expression (3a), more preferably in the range given by the following expression (3b):

$$0.4650<[\theta gF-(2.9795/vd)]<0.5005, \quad (3a)$$

$$0.4800<[\theta gF-(2.9795/vd)]<0.5000. \quad (3b)$$

An optical material satisfying the expressions (1), (2), and (3) can be obtained, for example, by adding $ZrO_2$ or alkali metal oxide to a $SiO_2$—$Nb_2O_5$ optical glass material and melting them. For example, optical glass containing $SiO_2$—$Nb_2O_5$ optical glass disclosed in Japanese Patent Laid-Open No. 10-265238 and optical glass containing an alkali metal disclosed in Japanese Patent Laid-Open No. 6-135738 are compounded and mixed. Subsequently, a platinum crucible is used for melt, and the resultant is molded into a block shape and slowly cooled after agitation and homogenization, so that an optical material satisfying the expressions (1), (2), and (3) can be obtained.

S-TIM27 (nd=1.63980, vd=34.5, θgF=0.5922), which is a trade name available by OHARA INC., and optical glass (nd=1.69072, vd=36.2, θgF=0.5775) of an example 6 in Japanese Patent Application Laid-Open No. 10-265238 may be mixed in a ratio of 2:3. Also in this case, a glass material (nd=1.67035, vd=35.5, θgF=0.5834) satisfying the conditional expressions (1), (2), and (3) can be obtained.

The negative lens GN is preferably formed of a glass material, for glass materials are more readily manufactured than organic materials such as resins. When glass materials are molded, the thickness is less restrictive than when resins are molded. For this reason, the degree of freedom of design of the refractive power of the negative lens GN can be increased in a manner in which the negative lens GN is formed of a glass material. In addition, since glass materials not only have excellent environmental resistance against a change in humidity and temperature but also have sufficient hardness, the negative lens GN can be used as a lens nearest the object side in each optical system.

The optical systems according to the examples preferably satisfy one or more of the following conditional expressions (11) to (17):

$$-6.0<fA/f<-0.2, \quad (11)$$

$$-2.0<(ra+rb)/(ra-rb)<2.0, \quad (12)$$

$$0.15<(min(|ra|,|rb|))/f<2.2, \quad (13)$$

$$1.55<nN<1.75, \quad (14)$$

$$1.01<nP/nN<1.20, \quad (15)$$

$$1.0<fF/fR<5.5, \quad (16)$$

$$|dA|/L<0.15. \quad (17)$$

In the expression (11), f represents the focal length of the whole of each optical system, and fA represents the focal length of the negative lens GN in a state where the refractive surface of the negative lens GN on the light incident side and the refractive surface thereof on the light emission side are in contact with air.

In the expressions (12) and (13), ra represents the radius of curvature of the refractive surface nearer the aperture stop SP among the refractive surfaces of the negative lens GN. In the expressions (12) and (13), rb represents the radius of curvature of the other refractive surface (farther from the aperture stop SP) of the negative lens GN. In the expression (13), the value of min(x, y) is a smaller value of x and y.

In the expressions (14) and (15), nN represents an average value of the refractive index of all negative lenses in each optical system at the d-line.

In the expression (15), nP represents an average value of the refractive index of all positive lenses in each optical system at the d-line.

In the expression (16), fR represents the focal length of a lens unit disposed on the light emission side of the aperture stop SP. In the expression (16), fF represents the focal length of a lens unit disposed on the light incident side of the aperture stop SP.

In the expression (17), dA represents a distance from the refractive surface of the negative lens GN nearer the aperture stop SP to the aperture stop SP in the direction of the optical axis, and L represents the entire length of each optical system. That is, L represents a distance from the refractive surface nearest the object side to the refractive surface nearest the image side in each optical system.

The expressions (11) to (16) will now be described.

The expression (11) defines the relationship between the focal length of the negative lens GN and the focal length of the entire system. In the case where the refractive power of the negative lens GN is so weak that fA is less than the lower limit of the expression (11), it is difficult for the primary chromatic aberration to be sufficiently corrected. In the case where the refractive power of the negative lens GN is so weak that the expression (11) is less than the lower limit, the Petzval sum is too large, and it is difficult for the field curvature to be decreased. In the case where the refractive power of the negative lens GN is so strong that fA exceeds the upper limit of the expression (11), the primary chromatic aberration is excessively corrected, which is not preferable.

The expression (11) is preferably in the range given by the following expression (11a), more preferably in the range given by the following expression (11b):

$$-5.0<fA/f<-0.30, \quad (11a)$$

$$-4.6<fA/f<-0.35. \quad (11b)$$

The expression (12) relates to a shape factor of the negative lens GN. An increased absolute value of the shape factor means a decreased difference between ra and rb. In this case, it is necessary for ra and rb to be decreased to enable the negative lens GN to have a refractive power enough to correct the chromatic aberration and the field curvature. In the case where the absolute value of the shape factor of the negative lens GN is so large that the expression (12) exceeds the upper limit or is less than the lower limit, the curvature of the negative lens GN is too large. In this case, the size of the optical systems increases, which is not preferable.

The expression (12) is preferably in the range given by the following expression (12a):

$$-1.6<(ra+rb)/(ra-rb)<1.3. \quad (12a)$$

The expression (12) is more preferably in the range given by the following expression (12b):

$$-1.0<(ra+rb)/(ra-rb)<0. \quad (12b)$$

The expression (12b) shows that the negative lens GN is a biconcave lens, and that the refractive surface nearer the aperture stop SP among the refractive surfaces of the negative lens GN has a curvature larger than that of the other refractive surface. This enables various aberrations including the spherical aberration, the field curvature, and comatic aberration to be successfully corrected.

The expression (13) relates to the radius of curvature of the refractive surface (refractive surface having a small absolute value of the radius of curvature) of the negative lens GN that has a stronger refractive power. When the expression (13) holds, the size of the optical systems can be decreased while the field curvature is sufficiently decreased. In the case where the curvature of the negative lens GN is so gentle that the radius of curvature of the refractive surface of the negative lens GN that has a stronger refractive power exceeds the upper limit of the expression (13), the refractive power of the negative lens GN decreases. In this case, the Petzval sum is too large, and it is difficult for the field curvature to be decreased. In the case where the curvature of the negative lens GN is so acute that the radius of curvature of the refractive surface of the negative lens GN that has a stronger refractive power is less than the lower limit of the expression (13), the size of the negative lens GN increases, which is not preferable.

The expression (13) is preferably in the range given by the following expression (13a), more preferably in the range given by the expression (13b):

$$0.20<(\min(|ra|,|rb|))/f<1.8, \quad (13a)$$

$$0.25<(\min(|ra|,|rb|))/f<1.6. \quad (13b)$$

The expression (14) relates to an average value of the refractive index of the negative lenses of each optical system. The negative lens GN has a relatively low refractive index, as described above. It is preferable that the refractive index of another negative lens other than the negative lens GN that each optical system includes be relatively low to further decrease the field curvature. In this case, when the expression (14) holds, the field curvature can be sufficiently decreased, and the size of the optical systems can be decreased.

In the case where the expression (14) exceeds the upper limit, the refractive index of the negative lenses of each optical system as a whole is too large, and the Petzval sum is too large, so that it is difficult for the field curvature to be decreased.

In the case where the expression (14) is less than the lower limit, the refractive index of the negative lenses of each optical system as a whole is too low, and a curvature that achieves a refractive power enough to sufficiently decrease primary axial chromatic aberration is too acute. In this case, the size of the optical systems increases, which is not preferable.

The expression (14) is preferably in the range given by the following expression (14a), more preferably in the range given by the following expression (14b):

$$1.60<nN<1.70, \quad (14a)$$

$$1.64<nN<1.68. \quad (14b)$$

The expression (15) relates to a ratio between an average value of the refractive index of the negative lenses and an average value of the refractive index of the positive lenses in each optical system. When the expression (15) holds, the field curvature and the axial chromatic aberration can be further decreased.

It is advantageous for the positive lenses to have a large refractive index to sufficiently decrease the field curvature. However, in the case where nP is so large that the expression (15) exceeds the upper limit, the Abbe number of the material of each positive lens as a whole is too small. Consequently, it is difficult for the primary axial chromatic aberration to be sufficiently decreased even when the negative lens GN is provided. In the case where nP is so low that the expression (15) is less than the lower limit, the Petzval sum is too large. In this case, it is difficult for the field curvature to be decreased, a sufficient decrease in the field curvature leads to an increase in the size of the optical systems.

The expression (15) is preferably in the range given by the following expression (15a), more preferably in the range given by the expression (15b):

$$1.02<nP/nN<1.10, \quad (15a)$$

$$1.03<nP/nN<1.08. \quad (15b)$$

The expression (16) relates to a ratio of the focal length between the lens unit disposed on the light incident side of the aperture stop SP and the lens unit disposed on the light emission side of the aperture stop SP. When the expression (16) holds, the entire length of the optical systems can be decreased while various aberrations are sufficiently corrected.

It is advantageous that the absolute value of the focal length of the lens unit disposed on the light incident side of the aperture stop SP is increased to correct the chromatic aberration and the field curvature. However, in the case where the absolute value of fF is so large that the expression (16) exceeds the upper limit, the entire length of the optical systems is too large. In the case where the absolute value of fF is so small that the expression (16) is less than the lower limit, it is difficult for the chromatic aberration and the field curvature to be sufficiently corrected. In the case where the expression (16) is less than the lower limit, it is difficult to ensure back focus.

The expression (16) is preferably in the range given by the following expression (16a), more preferably in the range given by the following expression (16b):

$$1.3<fF/fR<4.9, \quad (16a)$$

$$1.6<fF/fR<4.2. \quad (16b)$$

The expression (17) relates to arrangement of the negative lens GN. In general, the height of a paraxial chief ray is low near the aperture stop SP. For this reason, the axial chromatic aberration can be corrected in a manner in which the negative lens GN is disposed near the aperture stop SP such that the expression (17) is less than the upper limit, and in this case, off-axis aberration is not greatly affected.

The expression (17) is preferably in the range given by the following expression (17a), more preferably in the range given by the following expression (17b):

$$|dA|/L<0.11, \quad (17a)$$

$$|dA|/L<0.08. \quad (17b)$$

A rear lens unit preferably includes at least one lens having an aspheric surface to further decrease the field curvature in the meridional direction.

The negative lens GN preferably has a relatively strong refractive power to more effectively correct the chromatic aberration and the field curvature by using the negative lens GN. For this reason, the negative lens having the strongest refractive power in each optical system according to the examples preferably satisfies the expressions (1) to (3).

The optical systems according to the examples of the present invention may include a plurality of the above negative lenses GN. In this case, it is preferable that the negative lenses GN be disposed on the light incident side of the aperture stop SP and on the light emission side of the aperture stop SP, and that the negative lenses GN be disposed concentrically with each other with respect to the aperture stop SP. That is, it is preferable that the concave surface of each negative lens GN (first negative lens) disposed on the light incident side of the aperture stop SP face the object side, and that the concave surface of each negative lens GN (second negative lens) disposed on the light emission side of the aperture stop SP face the image side. The field curvature and astigmatism due to the refractive surface of the first negative lens on the image side and the refractive surface of the second negative lens on the object side can be further decreased in a manner in which the first negative lens and the second negative lens are thus arranged.

The examples 1 to 5 will now be described. In an optical system 1 according to the example 1, the negative lens GN is a ninth lens. In an optical system 2 according to the example 2, the negative lenses GN are a seventh lens and a ninth lens. In an optical system 3 according to the example 3, the negative lenses GN are a second lens, a fifth lens, a seventh lens, and an eighth lens. In an optical system 4 according to the example 4, the negative lenses GN are a third lens, a sixth lens, a seventh lens, and a ninth lens. In an optical system 5 according to the example 5, the negative lenses GN are a third lens, a sixth lens, a seventh lens, and a ninth lens.

The optical systems according to the examples thus include at least one negative lens GN satisfying the expressions (1) to (4) and successfully correct the chromatic aberration and the field curvature.

The optical systems according to the examples include at least one aspheric surface. The use of an aspheric surface lens enables good imaging performance to be ensured even with a large aperture ratio, which is preferable.

Numerical examples 1 to 5 corresponding to the examples 1 to 5 will now be described.

In surface data of the numerical examples, r represents the radius of curvature of each optical surface, and d (mm) represents an on-axis interval (distance along the optical axis) between a m-th surface and a (m+1)-th surface, where m represents a number of the surfaces from the light incident side, nd represents the refractive index of each optical member at the d-line, vd represents the Abbe number of each optical member at the d-line, and θgF represents the partial dispersion ratio of each optical member at the g-line and the F-line.

In the surface data of the numerical examples, for an optical surface having an aspheric surface shape, the symbol * (asterisk) is added after the surface number. In aspheric surface data, the aspherical coefficient of each aspheric surface is described, and "e±B" in the aspherical coefficient means "×10$^{±B}$". The aspheric surface shape of the optical surface is given by the following expression (18):

$$X = \frac{\frac{H^2}{R}}{1+\sqrt{1-(1+K)\left(\frac{H}{R}\right)^2}} + \quad (18)$$

$$A4H^4 + A6H^6 + A8H^8 + A10H^{10} A12H^{12}$$

where X represents a displacement from the vertex of the surface in the direction of the optical axis, H represents a height from the optical axis in the direction perpendicular to the direction of the optical axis, R represents the paraxial radius of curvature, K represents a conic constant, and A4, A6, A8, A10, and A12 represent aspherical coefficients.

In the numerical examples, values for d, a focal length (mm), an F number, and a half angle of view (°) are values when the optical systems according to the examples focus on an object at infinity. Back focus BF represents a distance from the final lens surface to the image plane. The entire lens length represents a value obtained by adding the back focus to a distance from the first lens surface to the final lens surface.

Numerical Example 1

| Unit mm | | | | | |
|---|---|---|---|---|---|
| Surface Data | | | | | |
| Surface Number | r | d | nd | vd | θgF |
| 1 | 36.474 | 1.90 | 1.84666 | 23.78 | 0.6205 |
| 2 | 21.323 | 8.38 | | | |
| 3* | 112.438 | 2.40 | 1.58313 | 59.46 | 0.5403 |
| 4* | 28.976 | 13.28 | | | |
| 5 | −32.245 | 1.60 | 1.49700 | 81.54 | 0.5375 |
| 6 | 90.880 | 0.43 | | | |
| 7 | 99.186 | 7.93 | 1.95375 | 32.32 | 0.5898 |
| 8 | −39.092 | 0.93 | | | |
| 9 | −33.367 | 1.60 | 1.76182 | 26.52 | 0.6136 |
| 10 | −106.855 | 0.15 | | | |
| 11 | 70.236 | 4.92 | 1.91650 | 31.60 | 0.5911 |
| 12 | −143.887 | 7.67 | | | |
| 13 | 54.180 | 6.43 | 1.49700 | 81.54 | 0.5375 |
| 14 | −89.718 | 0.15 | | | |
| 15 | 71.998 | 6.78 | 1.59522 | 67.74 | 0.5442 |
| 16 | −42.267 | 1.20 | 1.66565 | 35.64 | 0.5824 |
| 17 | 34.627 | 4.68 | | | |
| 18 (stop) | ∞ | 4.73 | | | |
| 19 | −35.422 | 6.39 | 1.49700 | 81.54 | 0.5375 |
| 20 | −16.728 | 1.30 | 1.95375 | 32.32 | 0.5898 |
| 21* | −58.275 | 0.15 | | | |
| 22 | 10283.105 | 7.19 | 1.59522 | 67.74 | 0.5442 |
| 23 | −26.692 | 0.15 | | | |
| 24 | −200.662 | 6.97 | 1.59522 | 67.74 | 0.5442 |
| 25 | −28.805 | 38.40 | | | |
| Image Plane | ∞ | | | | |

-continued

Unit mm

Aspheric Surface Data

Third Surface

K = 0.00000e+000 A4 = 5.26433e-005 A6 = -1.90260e-007
A8 = 5.24224e-010 A10 = -8.03466e-013 A12 = 5.94465e-016
Fourth Surface K = 0.00000e+000 A4 = 5.18369e-005 A6 = -1.73600e-007
A8 = 2.61614e-010 A10 = 1.88637e-013 A12 = -8.67180e-016
Twenty-First Surface K = 0.00000e+000 A4 = 1.49805e-005 A6 = 6.91340e-009
A8 = -1.43514e-011 A10 = -2.18168e-014 A12 = 6.27236e-018

Various Types of Data

| Focal Length | 24.47 |
| F Number | 1.45 |
| Half Angle of View (°) | 41.48 |
| Image Height | 21.64 |
| Entire Lens Length | 135.70 |
| BF | 38.40 |

Numerical Example 2

Unit mm

Surface Data

| Surface Number | r | d | nd | νd | θgF |
| --- | --- | --- | --- | --- | --- |
| 1 | 71.155 | 2.30 | 1.58313 | 59.38 | 0.5423 |
| 2* | 26.439 | 13.17 | | | |
| 3 | -70.966 | 2.00 | 1.48749 | 70.23 | 0.5300 |
| 4 | 82.436 | 2.50 | | | |
| 5 | 907.063 | 7.56 | 2.00100 | 29.13 | 0.5997 |
| 6 | -62.566 | 2.01 | | | |
| 7 | -42.191 | 2.20 | 1.76182 | 26.52 | 0.6136 |
| 8 | 403.338 | 1.19 | | | |
| 9 | 70.579 | 8.15 | 1.91082 | 35.25 | 0.5824 |
| 10 | -77.230 | 0.15 | | | |
| 11 | 274.921 | 8.82 | 1.59522 | 67.74 | 0.5442 |
| 12 | -32.028 | 1.80 | 1.67542 | 34.82 | 0.5825 |
| 13 | -287.503 | 7.20 | | | |
| 14 | 49.369 | 5.46 | 1.91082 | 35.25 | 0.5824 |
| 15 | -202.046 | 1.56 | | | |
| 16 | -170.231 | 1.60 | 1.67542 | 34.82 | 0.5825 |
| 17 | 25.760 | 2.76 | 1.72916 | 54.68 | 0.5444 |
| 18 | 34.562 | 5.93 | | | |
| 19 (stop) | ∞ | 7.07 | | | |
| 20 | -21.926 | 3.32 | 1.49700 | 81.54 | 0.5375 |
| 21 | -17.142 | 1.60 | 1.80000 | 29.84 | 0.6017 |
| 22 | -70.570 | 0.15 | | | |
| 23 | 111.677 | 7.23 | 1.59522 | 67.74 | 0.5442 |
| 24 | -30.044 | 0.15 | | | |
| 25* | -152.673 | 5.22 | 1.85135 | 40.10 | 0.5695 |
| 26 | -38.596 | 38.90 | | | |
| Image Plane | ∞ | | | | |

Aspheric Surface Data

Second surface

K = 0.00000e+000 A4 = -1.04435e-006 A6 = -2.06310e-009
A8 = 5.32852e-013 A10 = -4.53635e-015
Twenty-Fifth Surface K = 0.00000e+000 A4 = -7.68375e-006 A6 = -2.55253e-009
A8 = 1.22839e-012 A10 = -1.12763e-014

-continued

Unit mm

Various Types of Data

| Focal Length | 34.63 |
| F Number | 1.45 |
| Half Angle of View (°) | 31.99 |
| Image Height | 21.64 |
| Entire Lens Length | 140.00 |
| BF | 38.90 |

Numerical Example 3

Unit mm

Surface Data

| Surface Number | r | d | nd | νd | θgF |
| --- | --- | --- | --- | --- | --- |
| 1 | 144.139 | 3.00 | 1.58313 | 59.38 | 0.5423 |
| 2* | 42.089 | 19.77 | | | |
| 3 | -53.697 | 1.70 | 1.68118 | 33.06 | 0.5908 |
| 4 | 174.909 | 1.32 | | | |
| 5 | 335.601 | 9.54 | 1.95375 | 32.32 | 0.5898 |
| 6 | -77.157 | 0.15 | | | |
| 7 | 54.381 | 14.83 | 1.49700 | 81.54 | 0.5375 |
| 8 | -98.194 | 1.70 | 1.65310 | 35.34 | 0.5844 |
| 9 | -309.433 | 9.28 | | | |
| 10* | 38.536 | 11.38 | 1.85135 | 40.10 | 0.5695 |
| 11* | 757.224 | 2.94 | | | |
| 12 | 342.647 | 2.00 | 1.70771 | 31.16 | 0.5958 |
| 13 | 27.587 | 8.58 | | | |
| 14 (stop) | ∞ | 7.11 | | | |
| 15 | -30.487 | 1.20 | 1.66565 | 35.64 | 0.5824 |
| 16 | 45.980 | 8.79 | 1.85135 | 40.10 | 0.5695 |
| 17* | -51.660 | 0.15 | | | |
| 18 | -86.775 | 6.25 | 1.76385 | 48.51 | 0.5587 |
| 19 | -30.573 | 1.20 | 1.72959 | 32.26 | 0.5920 |
| 20 | -150.044 | 0.15 | | | |
| 21 | 166.556 | 7.96 | 1.59522 | 67.74 | 0.5442 |
| 22 | -41.572 | 38.50 | | | |
| Image Plane | ∞ | | | | |

Aspheric Surface Data

Second surface

K = 0.00000e+000 A4 = -4.96594e-007 A6 = -1.20686e-009
A8 = 2.28496e-012 A10 = -3.08411e-015 A12 = 1.37932e-018
Tenth surface K = 0.00000e+000 A4 = 2.32465e-007 A6 = -3.19874e-011
A8 = 1.12169e-012 A10 = -1.72974e-015 A12 = 2.47313e-018
Eleventh Surface K = 0.00000e+000 A4 = 1.62730e-006 A6 = -1.56297e-009
A8 = 2.66301e-012 A10 = -2.32843e-015 A12 = 8.02932e-019
Seventeenth Surface K = 0.00000e+000 A4 = 4.94122e-006 A6 = 5.30617e-009
A8 = -8.30190e-012 A10 = 2.55435e-014 A12 = -1.88171e-017

Various Types of Data

| Focal Length | 48.50 |
| F Number | 1.25 |
| Half Angle of View (°) | 24.04 |
| Image Height | 21.64 |
| Entire Lens Length | 157.48 |
| BF | 38.50 |

Numerical Example 4

| | | Unit mm | | | |
|---|---|---|---|---|---|
| | | Surface Data | | | |
| Surface Number | r | d | nd | vd | θgF |
| 1 | 97.201 | 4.81 | 1.90043 | 37.37 | 0.5774 |
| 2 | 148.986 | 1.00 | | | |
| 3 | 66.353 | 11.54 | 1.43875 | 94.93 | 0.5340 |
| 4 | −632.509 | 0.14 | | | |
| 5 | −1414.424 | 2.40 | 1.62606 | 39.09 | 0.5762 |
| 6 | 69.003 | 11.05 | | | |
| 7 | 59.918 | 5.91 | 1.90043 | 37.37 | 0.5774 |
| 8 | 147.457 | 0.15 | | | |
| 9 | 37.666 | 10.38 | 1.59522 | 67.74 | 0.5442 |
| 10 | 164.390 | 1.80 | | | |
| 11 | 176.546 | 2.37 | 1.65460 | 37.95 | 0.5675 |
| 12 | 22.719 | 10.92 | | | |
| 13 (stop) | ∞ | 6.68 | | | |
| 14 | −36.132 | 1.36 | 1.68690 | 35.00 | 0.5775 |
| 15 | 42.732 | 12.48 | 1.88300 | 40.76 | 0.5667 |
| 16 | −37.340 | 0.98 | | | |
| 17 | −32.889 | 1.35 | 1.72439 | 32.05 | 0.5867 |
| 18 | 76.992 | 8.48 | 1.76385 | 48.51 | 0.5587 |
| 19 | −71.354 | 0.15 | | | |
| 20* | 1571.279 | 5.37 | 1.88202 | 37.22 | 0.5770 |
| 21* | −75.713 | 1.53 | | | |
| 22 | 24017.317 | 2.21 | 1.95375 | 32.32 | 0.5898 |
| 23 | −437.170 | 37.40 | | | |
| Image Plane | ∞ | | | | |

Aspheric Surface Data

Twentieth Surface

K = 0.00000e+000 A4 = −2.29028e−006 A6 = −8.76024e−009
A8 = 1.93054e−011 A10 = −3.50986e−014
Twenty-First Surface K = 1.73820e+000 A4 = −9.97607e−007 A6 = −9.31403e−009
A8 = 2.03945e−011 A10 = −3.31404e−014

Various Types of Data

| Focal Length | 83.30 |
|---|---|
| F Number | 1.24 |
| Half Angle of View (°) | 14.56 |
| Image Height | 21.64 |
| Entire Lens Length | 140.49 |
| BF | 37.40 |

Numerical Example 5

| | | Unit mm | | | |
|---|---|---|---|---|---|
| | | Surface Data | | | |
| Surface Number | r | d | nd | vd | θgF |
| 1 | 87.168 | 5.79 | 1.91082 | 35.25 | 0.5824 |
| 2 | 168.218 | 1.00 | | | |
| 3 | 63.351 | 10.21 | 1.43875 | 94.93 | 0.5340 |
| 4 | 1609.394 | 0.15 | | | |
| 5 | 406.494 | 2.40 | 1.66565 | 35.64 | 0.5824 |
| 6 | 54.598 | 11.42 | | | |
| 7 | 50.778 | 5.63 | 1.91082 | 35.25 | 0.5824 |
| 8 | 90.541 | 0.15 | | | |
| 9 | 42.989 | 9.20 | 1.59522 | 67.74 | 0.5442 |
| 10 | 286.552 | 2.00 | | | |
| 11 | 594.110 | 2.37 | 1.63980 | 36.20 | 0.5778 |
| 12 | 24.708 | 10.52 | | | |
| 13(stop) | ∞ | 6.79 | | | |
| 14 | −38.091 | 1.37 | 1.66446 | 35.89 | 0.5821 |
| 15 | 40.648 | 13.66 | 1.83481 | 42.73 | 0.5648 |
| 16 | −38.136 | 0.76 | | | |
| 17 | −34.846 | 1.36 | 1.62045 | 38.09 | 0.5779 |
| 18 | 41.482 | 10.71 | 1.76385 | 48.51 | 0.5587 |
| 19 | −68.528 | 0.15 | | | |
| 20* | 715.155 | 4.09 | 1.85400 | 40.38 | 0.5688 |
| 21* | −146.976 | 1.53 | | | |
| 22 | 556.786 | 2.39 | 1.76385 | 48.51 | 0.5587 |
| 23 | −883.450 | 38.93 | | | |
| Image Plane | ∞ | | | | |

Aspheric Surface Data

Twentieth Surface

K = 0.00000e+000 A4 = −5.19353e−006 A6 = −8.91714e−009
A8 = 5.39469e−012 A10 = −9.08135e−015
Twenty-First Surface K = 1.82061e+001 A4 = −3.59906e−006 A6 = −7.82020e−009
A8 = 6.80728e−012 A10 = −8.16086e−015

Various Types of Data

| Focal Length | 83.00 |
|---|---|
| F Number | 1.24 |
| Half Angle of View (°) | 14.61 |
| Image Height | 21.64 |
| Entire Lens Length | 142.59 |
| BF | 38.93 |

The numerical values in the numerical examples are summarized below in Table 1.

TABLE 1

| | EXAMPLE 1 | EXAMPLE 2 | | EXAMPLE 3 | | |
|---|---|---|---|---|---|---|
| f | 24.471 | 34.630 | | 48.500 | | |
| LENS NUMBER | 9 | 7 | 9 | 2 | 5 | 7 | 8 |
| (1) vd | 35.64 | 34.82 | 34.82 | 33.06 | 35.30 | 31.20 | 35.60 |
| nd | 1.66565 | 1.67542 | 1.67542 | 1.68118 | 1.65310 | 1.70771 | 1.66565 |
| (2) nd − 14.387/vd | 1.2620 | 1.2622 | 1.2622 | 1.2460 | 1.2455 | 1.2466 | 1.2615 |
| θgF | 0.5824 | 0.5825 | 0.5825 | 0.5908 | 0.5844 | 0.5958 | 0.5824 |
| (3) θgF − 2.9795/vd | 0.4988 | 0.4969 | 0.4969 | 0.5007 | 0.5000 | 0.5003 | 0.4987 |
| fA | −28.417 | −53.516 | −33.018 | −60.132 | −220.943 | −42.506 | −27.368 |
| (11) fA/f | −1.161 | −1.545 | −0.953 | −1.240 | −4.556 | −0.876 | −0.564 |
| ra | 34.627 | −287.503 | 25.760 | 174.909 | −309.433 | 27.587 | −30.487 |
| rb | −42.267 | −32.028 | −170.231 | −53.697 | −98.194 | 342.647 | 45.980 |
| (12) (ra + rb)/(ra − rb) | −0.099 | 1.251 | −0.737 | 0.530 | 1.930 | −1.175 | −0.203 |
| (13) (min\|ra, rb\|)/f | 1.41502 | 0.92485 | 0.74385 | 1.10715 | 2.02462 | 0.56880 | 0.62860 |
| (14) nN | 1.66427 | 1.66388 | | 1.67006 | | |
| nP | 1.71800 | 1.76132 | | 1.75209 | | |
| (15) nP/nN | 1.03228 | 1.05856 | | 1.04912 | | |
| fF | 76.648 | 84.832 | | 108.636 | | |
| fR | 42.965 | 48.336 | | 56.253 | | |

TABLE 1-continued

| (16) |fF/fR| | 1.784 | | 1.755 | | | 1.931 | | |
|---|---|---|---|---|---|---|---|---|
| |dA| | 4.68 | 24.51 | | 8.69 | 61.72 | 34.18 | 8.58 | 7.11 |
| L | 97.31 | | 101.10 | | | 118.98 | | |
| (17) |dA|/L | 0.0481 | 0.2424 | | 0.0860 | 0.5187 | 0.2873 | 0.0721 | 0.0598 |

| | EXAMPLE 4 | | | | EXAMPLE 5 | | | |
|---|---|---|---|---|---|---|---|---|
| f | 83.000 | | | | 83.000 | | | |
| LENS NUMBER | 3 | 6 | 7 | 9 | 3 | 6 | 7 | 9 |
| (1) vd | 39.10 | 37.95 | 35.00 | 32.05 | 35.60 | 36.20 | 35.90 | 38.10 |
| nd | 1.62606 | 1.65460 | 1.68690 | 1.72439 | 1.66565 | 1.63980 | 1.66446 | 1.62045 |
| (2) nd − 14.387/vd | 1.2581 | 1.2755 | 1.2758 | 1.2755 | 1.2615 | 1.2424 | 1.2637 | 1.2428 |
| θgF | 0.5762 | 0.5675 | 0.5775 | 0.5867 | 0.5824 | 0.5778 | 0.5821 | 0.5779 |
| (3) θgF − 2.9795/vd | 0.5000 | 0.4890 | 0.4924 | 0.4937 | 0.4987 | 0.4955 | 0.4991 | 0.4997 |
| fA | −107.212 | −40.078 | −28.303 | −31.649 | −95.008 | −40.360 | −29.389 | −30.177 |
| (11) fA/f | −1.292 | −0.483 | −0.341 | −0.381 | −1.145 | −0.486 | −0.354 | −0.364 |
| ra | 60.285 | 22.719 | −36.132 | −32.889 | 54.598 | 24.708 | −38.091 | −34.846 |
| rb | 601.008 | 176.546 | 42.732 | 76.992 | 406.494 | 594.110 | 40.648 | 41.482 |
| (12) (ra + rb)/(ra − rb) | −1.223 | −1.295 | −0.084 | −0.401 | −1.310 | −1.087 | −0.032 | −0.087 |
| (13) (min|ra, rb|)/f | 0.72633 | 0.27372 | 0.43533 | 0.39625 | 0.65781 | 0.29769 | 0.45893 | 0.41983 |
| (14) nN | | 1.67299 | | | | 1.64830 | | |
| nP | | 1.78968 | | | | 1.75902 | | |
| (15) nP/nN | | 1.06975 | | | | 1.06717 | | |
| fF | | 177.355 | | | | 228.272 | | |
| fR | | 54.433 | | | | 54.994 | | |
| (16) |fF/fR| | | 3.088 | | | | 4.151 | | |
| |dA| | 42.58 | 10.92 | 6.68 | 21.50 | 41.29 | 10.52 | 6.79 | 22.58 |
| L | | 103.09 | | | | 104.6600 | | |
| (17) |dA|/L | 0.4130 | 0.1059 | 0.0648 | 0.2086 | 0.3945 | 0.1005 | 0.0649 | 0.2157 |

Optical Apparatus

Figure 12:
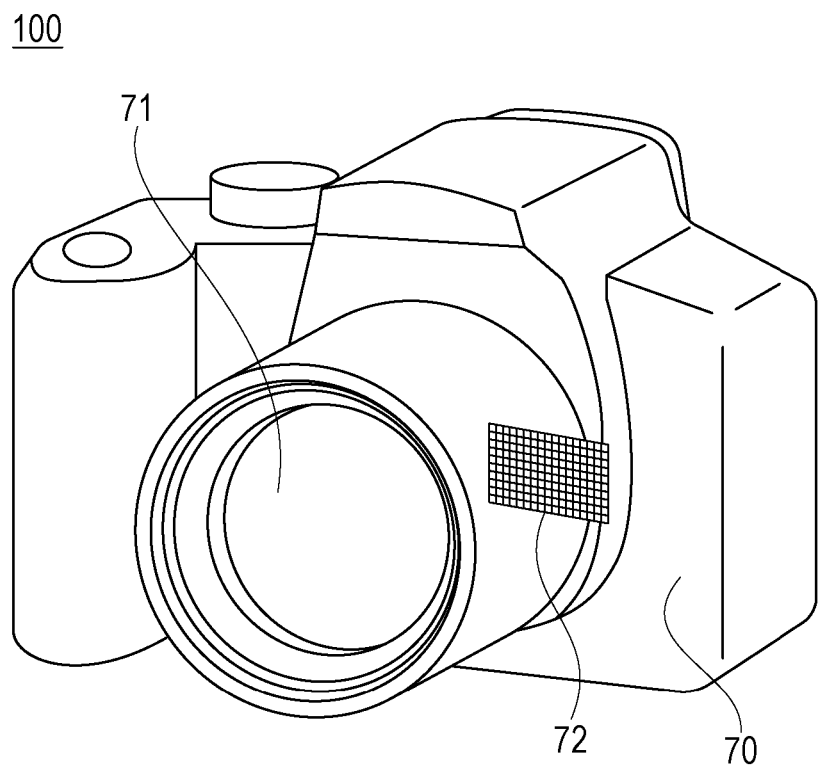
FIG. 12 is a schematic view of an image pickup apparatus.

FIG. 12 is a schematic view of an image pickup apparatus (digital still camera) 100 corresponding to an optical apparatus according to an embodiment of the present invention. The image pickup apparatus 100 according to the embodiment includes a camera main body 70, an optical system 71 that is the same as one of the optical systems according to the above examples 1 to 5, and a photodetector (image pickup device) 72 that performs photoelectric conversion of an image formed by the optical system 71.

The image pickup apparatus 100 according to the embodiment includes the optical system 71 that is the same as one of the optical systems according to the examples 1 to 5, and can obtain a high-quality image having successfully corrected chromatic aberration and field curvature. The photodetector 72 may be an image pickup device such as a CCD sensor or a CMOS sensor.

The optical systems according to the above examples are not limited to a digital still camera illustrated in FIG. 12 and may be used for various optical apparatus such as a silver-halide film camera, a video camera, and a telescope.

Although a preferred embodiment and preferred examples of the present invention are described above, the present invention is not limited to the embodiment and the examples, and various combinations, modifications, and alterations can be made within the range of the concept of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-193118 filed Sep. 30, 2016, which is hereby incorporated by reference herein in its entirety.

What is claimed is:

1. An optical system comprising:
a negative lens,
   wherein the following conditional expressions are satisfied:

$30 \leq vd \leq 40$;

$1.225 \leq [nd-(14.387/vd)] \leq 1.276$; and $0.4300 \leq [\theta gF-(2.9795/vd)] \leq 0.5010$, where vd is an Abbe number of the negative lens, θgF is a partial dispersion ratio of the negative lens at a g-line and an F-line, and nd is a refractive index of the negative lens at a d-line.

2. The optical system according to claim 1,
   wherein the following conditional expression is satisfied:

$-6 < fA/f < -0.2$, where f is a focal length of the optical system, and fA is a focal length of the negative lens.

3. The optical system according to claim 1, further comprising:
an aperture stop,
   wherein the following conditional expression is satisfied:

$-2 < (ra+rb)/(ra-rb) < 2$, where ra is a radius of curvature of a refractive surface nearer the aperture stop among refractive surfaces of the negative lens, and rb is a radius of curvature of another refractive surface.

4. The optical system according to claim 1, further comprising:
an aperture stop,
   wherein the following conditional expression is satisfied:

$0.15 < (\min(|ra|,|rb|))/f < 2.2$, where ra is a radius of curvature of a refractive surface nearer the aperture stop among refractive surfaces of the negative lens, rb is a radius of curvature of another refractive surface, and f is a focal length of the optical system.

5. The optical system according to claim 1, further comprising:
one or more negative lenses containing the negative lens,
wherein the following conditional expression is satisfied:

$1.55 < nN < 1.75$, wherein nN is an average value of refractive indices of all negative lenses included in the optical system.

6. The optical system according to claim 1, further comprising:
one or more negative lenses containing the negative lens, and
one or more positive lenses,
wherein the following conditional expression is satisfied:

$1.01 < nP/nN < 1.2$, where nN is an average value of refractive indices of all negative lenses included in the optical system includes, and nP is an average value of refractive indices of all positive lenses included in the optical system.

7. The optical system according to claim 1, further comprising:
an aperture stop,
wherein the following conditional expression is satisfied:

$1.0 < fF/fR < 5.5$, where fR is a focal length of a lens unit disposed on a light emission side of the aperture stop, and fF is a focal length of a lens unit disposed on a light incident side of the aperture stop.

8. The optical system according to claim 1, further comprising:
an aperture stop,
wherein a lens unit disposed on a light emission side of the aperture stop includes a lens having an aspheric surface.

9. The optical system according to claim 1,
wherein the negative lens is formed of a glass material.

10. The optical system according to claim 1, further comprising:
an aperture stop,
wherein the following conditional expression is satisfied:

$|dA|/L < 0.15$, where dA is a distance from the aperture stop to a refractive surface of the negative lens nearer the aperture stop, and L is a distance from a refractive surface nearest an object side to a refractive surface nearest an image side in the optical system.

11. The optical system according to claim 1,
wherein the negative lens has a largest refractive power among negative lenses that the optical system includes.

12. An optical system comprising:
an aperture stop;
a first negative lens disposed on a light incident side of the aperture stop and having a concave surface that faces an image side; and
a second negative lens disposed on a light emission side of the aperture stop and having a concave surface that faces an object side,
wherein the following conditional expressions are satisfied:

$30 \le vd1 \le 40$;

$30 \le vd2 \le 40$;

$1.225 \le [nd1-(14.387/vd1)] \le 1.276$;

$1.225 \le [nd2-(14.387/vd2)] \le 1.276$;

$0.4300 \le [\theta gF1-(2.9795/vd1)] \le 0.5010$; and $0.4300 \le [\theta gF2-(2.9795/vd2)] \le 0.5010$, where vd1 is an Abbe number of the first negative lens, vd2 is an Abbe number of the second negative lens, θgF1 is a partial dispersion ratio of the first negative lens at a g-line and an F-line, θgF2 is a partial dispersion ratio of the second negative lens at the g-line and the F-line, nd1 is a refractive index of the first negative lens at a d-line, and nd2 is a refractive index of the second negative lens at the d-line.

13. An optical apparatus comprising:
the optical system according to claim 1; and
an image pickup device that receives an image formed by the optical system.

14. The optical apparatus, comprising:
the optical system according to claim 12; and
an image pickup device that receives an image formed by the optical system.

* * * * *